United States Patent
Baek et al.

(10) Patent No.: US 12,021,205 B2
(45) Date of Patent: Jun. 25, 2024

(54) METHOD OF REUSING POSITIVE ELECTRODE MATERIAL

(71) Applicant: LG CHEM, LTD., Seoul (KR)

(72) Inventors: Joo Yul Baek, Daejeon (KR); Woo Ha Kim, Daejeon (KR); In Seong Kim, Daejeon (KR); Jun Muk Lim, Daejeon (KR); Sang Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 594 days.

(21) Appl. No.: 16/954,427

(22) PCT Filed: May 8, 2019

(86) PCT No.: PCT/KR2019/005507
§ 371 (c)(1),
(2) Date: Jun. 16, 2020

(87) PCT Pub. No.: WO2019/216646
PCT Pub. Date: Nov. 14, 2019

(65) Prior Publication Data
US 2021/0083336 A1   Mar. 18, 2021

(30) Foreign Application Priority Data

May 11, 2018   (KR) .......................... 10-2018-0054474

(51) Int. Cl.
*H01M 10/54* (2006.01)
*H01M 4/02* (2006.01)
*H01M 4/36* (2006.01)
*H01M 10/0525* (2010.01)

(52) U.S. Cl.
CPC ............. *H01M 10/54* (2013.01); *H01M 4/36* (2013.01); *H01M 10/0525* (2013.01); *H01M 2004/028* (2013.01)

(58) Field of Classification Search
CPC ..... H01M 4/139–13915; H01M 10/54; H01M 2004/028; Y02W 30/84
See application file for complete search history.

(56) References Cited

U.S. PATENT DOCUMENTS

| 6,524,737 | B1 | 2/2003 | Tanii et al. | |
|---|---|---|---|---|
| 2003/0222020 | A1 | 12/2003 | Lee et al. | |
| 2007/0134546 | A1* | 6/2007 | Hashimoto | H01M 10/4285 429/49 |
| 2008/0102196 | A1* | 5/2008 | Morishima | H01M 4/131 427/74 |
| 2011/0147679 | A1* | 6/2011 | Inukai | H01M 4/1391 423/625 |
| 2012/0052379 | A1 | 3/2012 | Roh et al. | |
| 2013/0266855 | A1 | 10/2013 | Kim et al. | |
| 2013/0344396 | A1* | 12/2013 | Bosnyak | H01M 50/44 252/62.2 |
| 2014/0238576 | A1* | 8/2014 | Zhong | H01G 11/28 156/62.2 |
| 2015/0270552 | A1* | 9/2015 | Lee | H01M 4/387 427/126.6 |
| 2017/0062798 | A1* | 3/2017 | Wang | B05B 5/1683 |
| 2017/0092948 | A1* | 3/2017 | Ren | C01G 53/50 |
| 2017/0271666 | A1 | 9/2017 | Kishi et al. | |
| 2017/0338468 | A1 | 11/2017 | Kim et al. | |
| 2018/0159131 | A1* | 6/2018 | Seol | H01M 10/0525 |
| 2021/0050634 | A1* | 2/2021 | Schmidt | H01M 10/0525 |

FOREIGN PATENT DOCUMENTS

| CN | 101212074 A | 7/2008 |
|---|---|---|
| CN | 101572329 A | 11/2009 |
| CN | 102077409 A | 5/2011 |
| CN | 105375079 A | 3/2016 |
| CN | 107112524 A | 8/2017 |
| EP | 2306583 A1 | 4/2011 |
| JP | H10-241750 A | 9/1998 |
| JP | 2010-062105 A | 3/2010 |
| JP | 2011-060612 A | 3/2011 |
| JP | 2014-127417 A | 7/2014 |
| JP | 2014-207192 A | 10/2014 |
| JP | 2014207192 A * | 10/2014 |

(Continued)

OTHER PUBLICATIONS

Machine translation of JP 2014207192 A (Year: 2014).*
Machine translation of KR 20060010650 A (Year: 2006).*
He, Li-Po, et al. "Recovery of cathode materials and Al from spent lithium-ion batteries by ultrasonic cleaning." Waste management 46 (2015): 523-528. (Year: 2015).*
Extended European Search Report issued by the European Patent Office dated May 7, 2021 in a corresponding European Patent Application No. 19799542.6.
International Search Report (with partial translation) and Written Opinion issued in corresponding International Patent Application No. PCT/KR2019/005507, dated Aug. 23, 2019.

*Primary Examiner* — Matthew T Martin
*Assistant Examiner* — Grace Ann Kenlaw
(74) *Attorney, Agent, or Firm* — Morgan, Lewis & Bockius LLP

(57) ABSTRACT

The present invention relates to a method of reusing a positive electrode material, and more particularly, the method includes: inputting a positive electrode for a lithium secondary battery comprising a current collector, and a positive electrode active material layer formed on the current collector and including a first positive electrode active material, a first binder and a first conducting agent, into a solvent; separating at least a portion of the positive electrode active material layer from the current collector; adding second binder powder to the solvent and performing primary mixing a resulting mixture; and preparing a positive electrode material slurry by adding a second positive electrode active material and a second conducting agent to the solvent and performing secondary mixing a resulting mixture.

17 Claims, No Drawings

(56) References Cited

FOREIGN PATENT DOCUMENTS

| | | | |
|---|---|---|---|
| JP | 2016-035809 A | | 3/2016 |
| KR | 10-2003-0093583 A | | 12/2003 |
| KR | 20060010650 A | * | 2/2006 |
| KR | 10-2012-0019932 A | | 3/2012 |
| KR | 10-2013-0113748 A | | 10/2013 |
| KR | 10-2015-0075200 A | | 7/2015 |
| KR | 20160146580 A | * | 12/2016 |
| KR | 10-2017-0033787 A | | 3/2017 |
| KR | 10-2017-0107374 A | | 9/2017 |
| WO | 2000/019557 A1 | | 4/2000 |

* cited by examiner

METHOD OF REUSING POSITIVE ELECTRODE MATERIAL

CROSS-REFERENCE TO RELATED APPLICATION

This application claims priority to and the benefit of Korean Patent Application No. 10-2018-0054474, filed on May 11, 2018, the disclosure of which is incorporated herein by reference in its entirety.

TECHNICAL FIELD

The present invention relates to a method of reusing a positive electrode material.

BACKGROUND ART

According to the increase in the development and demand for mobile devices, the demand for a secondary battery as an energy source is rapidly increasing, and among secondary batteries, a lithium secondary battery which exhibits a high energy density and a high voltage, and has a longer life span and a low self-discharge rate has been commercialized and widely used.

Generally, a lithium secondary battery is manufactured using a positive electrode and a negative electrode, which include electrode active materials capable of intercalating/deintercalating lithium ions, and an electrolyte, which is a medium for transferring lithium ions.

Among these components, the positive electrode is manufactured by applying a positive electrode active material slurry including a positive electrode active material, a binder and a conducting agent on a positive electrode collector, and drying and rolling the positive electrode collector on which the slurry is applied. Afterward, the positive electrode may be used in a shape suitable for being applied to a product, for example, a rectangular shape.

Recently, as a mobile device becomes thinner, the positive electrode may be used in various shapes such as circular, "¬" and "ᄃ" shapes, in addition to the above-described rectangular shape described above to be applied to a product, and therefore, a proportion of the part remaining after use is also higher.

For this reason, while there has been an attempt to reuse the remaining positive electrode, there was a problem of a complicated reusing process including separation and mixing a positive electrode active material layer and treatment of a solvent used in the separation of the positive electrode active material layer.

In Korean Unexamined Patent Application Publication No. 10-2003-0093583, a device and method for recovering a lithium cobalt oxide from a waste lithium ion battery are disclosed.

PRIOR ART DOCUMENT

Patent Document

Korean Unexamined Patent Application Publication No. 10-2003-0093583

DISCLOSURE

Technical Problem

The present invention is directed to providing a method of reusing a positive electrode material, which can exhibit battery characteristics at the same levels as a new positive electrode active material while reusing a positive electrode active material layer separated from a manufactured positive electrode.

Technical Solution

The present invention provides a method of reusing a positive electrode material, and the method more particularly includes: inputting a positive electrode for a lithium secondary battery, which includes a current collector, and a positive electrode active material layer formed on the current collector and including a first positive electrode active material, a first binder and a first conducting agent, into a solvent; separating at least a portion of the positive electrode active material layer from the current collector; adding second binder powder to the solvent and performing primary mixing a resulting mixture; and preparing a positive electrode material slurry by adding a second positive electrode active material and a second conducting agent to the solvent and performing secondary mixing a resulting mixture. Here, a ratio of a total weight of the first positive electrode active material, the first binder and the first conducting agent, which are included in a separated positive electrode active material layer, to a total weight of the second positive electrode active material, the second binder powder and the second conducting agent ranges from 8:92 to 28:72.

Advantageous Effects

According to a method of reusing a positive electrode material according to the present invention, as a positive electrode active material, a binder and a conducting agent are additionally added to a positive electrode active material, a binder and a conducting agent, which are derived from a positive electrode active material layer separated from a positive electrode current collector, in a specific ratio, and then mixed together, the same level of battery performance as using a new positive electrode active material can be exhibited.

According to the method of reusing a positive electrode material according to the present invention, primary and secondary mixing processes are performed, and particularly, in primary mixing, an additional binder can be mixed first in the form of powder to be uniformly dispersed in a solvent, and therefore, an electrode can have excellent binding strength and excellent battery performance.

DETAILED DESCRIPTION OF INVENTION

Terms and words used in the specification and claims should not be construed as limited to general or dictionary terms, and should be interpreted with the meaning and concept in accordance with the technical idea of the present invention based on the principle that the inventors can appropriately define the concepts of terms in order to explain the invention in the best way.

The terms used in the specification are used only to explain specific examples, not to limit the present invention. Singular expressions include plural referents unless clearly indicated otherwise in the context.

The terms "include" and "have" used herein designate the presence of characteristics, numbers, stages, components or a combination thereof, and it should be understood that the possibility of the presence or addition of one or more other characteristics, numbers, stages, components, or a combination thereof is not excluded in advance.

The "%" used herein means a weight percent (wt %) unless explicitly indicated otherwise.

The present invention provides a method of reusing a positive electrode material, and the method more particularly includes: (1) inputting a positive electrode for a lithium secondary battery comprising a current collector, and a positive electrode active material layer formed on the current collector and including a first positive electrode active material, a first binder and a first conducting agent, into a solvent; (2) separating at least a portion of the positive electrode active material layer from the current collector; (3) adding second binder powder to the solvent and performing primary mixing a resulting mixture; and (4) preparing a positive electrode material slurry by adding a second positive electrode active material and a second conducting agent to the solvent and performing secondary mixing a resulting mixture. Here, a ratio of a total weight of the first positive electrode active material, the first binder and the first conducting agent, which are included in a separated positive electrode active material layer, to a total weight of the second positive electrode active material, the second binder powder and the second conducting agent ranges from 8:92 to 28:72.

Hereinafter, the steps of the reuse method according to the present invention will be described in further detail.

(1) Input of a Positive Electrode for a Lithium Secondary Battery

First, a positive electrode for a lithium secondary battery comprising a current collector, and a positive electrode active material layer formed on the current collector and including a first positive electrode active material, a first binder and a first conducting agent, is input into a solvent.

The current collector is not particularly limited as long as it has conductivity without causing chemical change in a battery, and for example, stainless steel, aluminum, nickel, titanium, calcined carbon, or aluminum or stainless steel whose surface is treated with carbon, nickel, titanium or silver may be used.

The positive electrode active material layer is formed on the current collector.

The positive electrode active material layer may include the first positive electrode active material, the first binder and the first conducting agent.

The first positive electrode active material is a compound enabling reversible intercalation and deintercalation of lithium, which may specifically include a lithium composite metal oxide including one or more types of metals selected from cobalt, manganese, nickel and aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg and Mo, each of p2, q2, r3 and s2 is the atomic fraction of an independent element, and $0<p2<1$, $0<q2<1$, $0<r3<1$, $0<s2<1$, $p2+q2+r3+s2=1$), etc.), which may be used alone or in combination of two or more thereof. Among these, to increase the capacity characteristic and stability of a battery, the lithium composite metal oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium nickel-cobalt-aluminum oxide (e.g., $Li(Ni_{0.8}Co_{0.15}Al_{0.05})O_2$, etc.), and in consideration of significant improvement caused by control of the type and content ratio of a constituent element for forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, which may be used alone or in a mixture of two or more thereof.

The first positive electrode active material may be included at 80 to 99 wt % based on the total weight of the first positive electrode active material, the first binder and the first conducting agent.

The first binder is a component helping in binding between an active material and a conducting agent and binding to the current collector, and an example of the first binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene terpolymer (EPDM), sulfonated-EPDM, styrene butadiene rubber, fluorine rubber, or a combination of two or more thereof.

The first binder may be included at 0.5 to 30 wt %, and preferably, 1 to 15 wt % based on the total weight of the first positive electrode active material, the first binder and the first conducting agent.

The first conducting agent is not particularly limited as long as it imparts conductivity without inducing a chemical change in the battery, and may be, for example, graphite; a carbon-based material such as a carbon nanotube, carbon black, acetylene black, Ketjen black, channel black, furnace black, lamp black or thermal black; a conductive fiber such as a carbon fiber or a metal fiber; metal powder such as fluorocarbon powder, aluminum powder, or nickel powder; a conductive whisker, for example consisting of zinc oxide or potassium titanate; a conductive metal oxide such as titanium oxide; or a conductive material such as a polyphenylene derivative. Specific examples of commercially available conducting agent include the acetylene black series (Chevron Chemical Company, Denka Singapore Private Limited, Gulf Oil Company, etc.), Ketjen black, the EC series (products of Armak Company and Vulcan XC-72 (Cabot Company)) and Super P (TIMCAL).

The first conducting agent may be included at 0.5 to 30 wt %, and preferably, 1 to 15 wt %, based on the total weight of the first positive electrode active material, the first binder and the first conducting agent.

The positive electrode active material layer may be formed by forming a positive electrode material slurry by mixing the above-described first positive electrode active material, first binder and first conducting agent with a solvent for forming a slurry, and coating the current collector with the positive electrode material slurry and then drying and rolling the resulting product.

The solvent for forming a slurry may be, for example, N-methyl-2-pyrrolidone (hereinafter, abbreviated as NMP).

The positive electrode for a lithium secondary battery may be a portion remaining after tableting into a desired shape, following the formation of a positive electrode active material layer on the current collector. According to the present invention, the reuse of the positive electrode material of the positive electrode, which remains after tableting, results in cost reduction, and as to be described below, a positive electrode material or a positive electrode exhibiting an equivalent level of performance as a new or unused positive electrode material or positive electrode can be realized without an excessive treatment process.

The positive electrode for a lithium secondary battery may be an uncycled positive electrode, which has not been subjected to a charge/discharge cycling process, and as to be described below, since the present invention uses a positive electrode active material which has not been subjected to a charge/discharge cycle process, the proportion of a positive electrode active material to be reused may be increased, and an additional lithium injection process is not needed, which is preferable in terms of reducing costs and improving process efficiency.

(2) Separation of Positive Electrode Active Material Layer

After the positive electrode for a lithium secondary battery is input into the solvent, at least a portion of the positive electrode active material layer is separated from the current collector.

The solvent may be used to recover the first positive electrode active material, the first binder and the conducting agent from the current collector, and may directly serve as a solvent for forming a slurry in the subsequent reuse of a positive electrode material. That is, since the solvent can simultaneously serve as a separation solvent and a solvent for forming a slurry, it is preferable for reducing costs and improving process efficiency.

The solvent may be a solvent for forming a slurry conventionally used in the art without limitation, which may be the same material as the solvent for forming a slurry, for example, NMP.

The solvent may be prepared at a suitable amount for separation of the positive electrode active material layer. Specifically, in order to easily separate the positive electrode active material layer from the current collector, and increase the proportion of a separated positive electrode active material layer, a weight of the separable positive electrode active material layer may be 0.25 to 0.75 fold, and preferably, 0.3 to 0.6 fold the solvent weight.

The method of separating the positive electrode active material layer is not particularly limited, and for instance, to improve separation efficiency, at least a portion of the positive electrode active material layer may be separated from the current collector through ultrasonication.

The ultrasonication may be performed for 5 to 60 minutes, and preferably, 7 to 25 minutes in order to improve separation efficiency and reduce costs.

During the separation, a solvent temperature may be 25° C. or more and less than the boiling point of the solvent. The solvent temperature is preferably 25 to 100° C., and more preferably, 50 to 80° C.

The positive electrode active material layer separated from the current collector may be at least a portion of the positive electrode active material layer before the separation. Specifically, the separated positive electrode active material layer may be 70 wt % or more, and preferably 75 wt % or more, based on the total weight of the positive electrode active material layer before the separation. When the content of the separated positive electrode active material layer is in the above range, it is preferable in terms of cost reduction. The above range of the positive electrode active material layer is preferably separated by adjusting conditions for the ultrasonication.

After at least a portion of the positive electrode active material layer is separated from the current collector, the current collector may be removed from the solvent, and therefore, components of the separated positive electrode active material layer, may be well mixed with a second positive electrode active material, second binder powder and a second conducting agent, which will be described below.

(3) Primary Mixing

After the positive electrode active material layer is separated, second binder powder is added to the solvent for primary mixing.

The second binder powder is added to the solvent in the form of powder.

Generally, a binder does not dissolve well in a solvent, and is added to a positive electrode material or a positive electrode material slurry in the form of a dispersion dissolved in a solvent. However, when the binder is used in the form of a dispersion, due to a solvent added in the dispersion, the total amount of the solvent is excessively increased, the viscosity of slurry is lowered, thereby lowering adhesive strength, and the solid content in the slurry is greatly decreased, which is not preferable for battery formation.

Alternatively, when a binder is added in the form of powder, the binder is not easily dissolved in a solvent, and there is a possibility that the binder is non-uniformly dispersed in the solvent. As a result, the adhesive strength of the positive electrode active material may be lowered, or it may be difficult to separate the positive electrode active material layer from the current collector.

However, in the method of reusing a positive electrode material according to the present invention, before a second positive electrode active material and a second conducting agent are added, the second binder powder may be previously added and subjected to primary mixing, and thereby the second binder powder may be previously dispersed and dissolved uniformly in the solvent. In addition, when a binder is further added in the form of a dispersion, the solid content of the solvent is lowered due to the further addition of the solvent, and thus there is a possibility of lower adhesive strength when the reused positive electrode material is applied in the manufacture of a positive electrode. However, in the method of reusing a positive electrode material according to the present invention, a second binder material is used in the form of powder and previously dissolved without using an additional solvent. Thus, desired levels of a solid content and viscosity may be ensured, and the adhesive strength of a reused positive electrode material may be easily improved without an unnecessary and complicated process such as solvent removal.

After the second binder powder is added, during the primary mixing, the separated positive electrode active material layer may be pulverized. Accordingly, the second binder powder may be mixed with components of the pulverized positive electrode active material layer.

The second binder powder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene terpolymer (EPDM), sulfonated-EPDM, styrene butadiene rubber, fluorine rubber, or a mixture of two or more thereof.

The second binder powder may be the same as or different from the first binder.

The second binder powder may have an average particle size ($D_{50}$) of 100 to 300 μm, preferably, 150 to 250 μm, and when the average particle size ($D_{50}$) is in the above range, the second binder powder may be more easily dispersed in a solvent during the primary mixing.

The second binder powder may be input into a solvent at 0.5 to 30 wt %, preferably 1 to 15 wt %, with respect to the total weight of a second positive electrode active material, the second binder powder and a second conducting agent, which will be described below.

In the primary mixing, to effectively dissolve and mix the second binder powder, specifically, the solvent temperature may be 25° C. or more and less than the boiling point of the solvent, preferably 25 to 100° C., and more preferably 50 to 85° C.

The primary mixing may be performed for 30 to 600 minutes, preferably 120 to 480 minutes, and while the primary mixing is performed for the above-mentioned time, the dissolution of the second binder powder may be facilitated.

(4) Secondary Mixing

After the primary mixing, a positive electrode material slurry is prepared by adding a second positive electrode active material and a second conducting agent to the solvent and performing secondary mixing.

A positive electrode material slurry may be prepared by performing secondary mixing of the first positive electrode active material, the first binder and the first conducting agent, which are separated from the positive electrode active material layer with the second binder powder dissolved in a solvent during the primary mixing and the added second positive electrode active material and second conducting agent in a solvent.

As described above, since the second binder powder is uniformly dispersed and dissolved in the solvent through the primary mixing, the prepared positive electrode material slurry may have excellent adhesive strength.

In addition, as the solvent used to separate the positive electrode active material layer is used as a solvent for forming a slurry, costs may be lowered and process efficiency may be improved.

The second positive electrode active material is a compound enabling reversible intercalation and deintercalation of lithium, which specifically includes a lithium composite metal oxide including one or more metals such as cobalt, manganese, nickel and aluminum and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-y}Mn_yO_2$ (where $0<Y<1$), $LiMn_{2-z}Ni_zO_4$ (where $0<Z<2$), etc.), a lithium-nickel-cobalt-based oxide (e.g., $LiNi_{1-y1}Co_{y1}O_2$ (where $0<Y1<1$), etc.), a lithium-manganese-cobalt-based oxide (e.g., $LiCo_{1-y2}Mn_{y2}O_2$ (where $0<Y2<1$), $LiMn_{2-z1}Co_{z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$) or $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{S2})O_2$ (where M is selected from the group consisting of Al, Fe, V, Cr, Ti, Ta, Mg and Mo, and p2, q2, r3 and s2 are atomic fractions of independent elements, respectively, and $0<p2<1$, $0<q2<1$, $0<r3<1$, $0<s2<1$, $p2+q2+r3+s2=1$), etc.), which may be used alone or as a combination of two or more thereof. Among these, to increase the capacity and stability of a battery, the lithium composite metal oxide may be $LiCoO_2$, $LiMnO_2$, $LiNiO_2$, lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.), and in consideration of remarkable improvement according to the control of the types and content ratio of constituent elements forming a lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ or $Li(Ni_{0.8}Mn_{0.1}Co_{0.1})O_2$, which may be used alone or a mixture of two or more thereof.

The second positive electrode active material may be the same as or different from the first positive electrode active material.

The second positive electrode active material may be added at 80 to 99 wt % with respect to the total weight of the second positive electrode active material, the second binder powder and the second conducting agent.

The second conducting agent may be graphite; a carbon-based material such as carbon black, acetylene black, Ketjen black, channel black, furnace black, lamp black, thermal black or a carbon fiber; metal powder or metal fiber consisting of copper, nickel, aluminum, or silver; a conductive whisker, for example consisting of zinc oxide or potassium titanate; a conductive metal oxide such as titanium oxide; or a conductive material such as a polyphenylene derivative. Specific examples of commercially available conducting agent include the acetylene black series (Chevron Chemical Company, Denka Singapore Private Limited, Gulf Oil Company, etc.), Ketjen black, the EC series (products of Armak Company and Vulcan XC-72 (Cabot Company)) and Super P (TIMCAL).

The second conducting agent may be the same as or different from the above-described first conducting agent.

The second conducting agent may be added at 0.5 to 30 wt %, and preferably 1 to 15 wt %, with respect to the total weight of the second positive electrode active material, the second binder powder and the second conducting agent.

A ratio of the total weight of the first positive electrode active material, the first binder and the first conducting agent and the total weight of the second positive electrode active material, the second binder powder and the second conducting agent may be 8:92 to 28:72, and preferably 10:90 to 25:75. The above range is preferable because costs may be reduced due to the reuse of the first positive electrode active material, and desired levels of battery characteristics may be ensured.

In addition, the present invention may be for reusing the positive electrode for a lithium secondary battery which has not been subjected to a charge/discharge cycle process, and therefore, is preferable because, even when the reused first positive electrode active material, the first binder and the first conducting agent are used at high contents, excellent battery characteristics may be exhibited, and a separate process of further injecting lithium is not required.

With respect to 100 wt % of the total weight of the first positive electrode active material, the first binder, the first conducting agent, the second positive electrode active material, the second binder powder and the second conducting agent, when the total weight of the first positive electrode active material, the first binder and the first conducting agent is less than 8 wt %, it is not preferable in terms of the cost reduction resulting from the reuse of the first positive electrode active material, and when the total weight is more than 28 wt %, an amount of the first positive electrode active material which could be damaged through a process of forming a positive electrode active material layer such as rolling is excessive, and thus desired levels of battery characteristics may not be exhibited.

The total weight of the first positive electrode active material, the first binder, the first conducting agent, the second positive electrode active material, the second binder powder and the second conducting agent may be 2.25 to 6 fold, and preferably 2.4 to 4 fold the weight of the solvent. In the above range, a desired level of viscosity of the positive electrode material slurry may be ensured, and thus, when applied to the manufacture of a positive electrode, an excellent level of adhesive strength may be exhibited.

The viscosity of the positive electrode material slurry may be, at 25° C., 1,000 to 30,000 cP, and preferably, 1,500 to 25,000 cP, and when the above viscosity range is satisfied, it is preferable in terms of stable supply and coating of the slurry during coating.

A positive electrode for a lithium secondary battery may be manufactured by coating a current collector with the positive electrode material slurry and then drying and rolling the resulting product. The positive electrode material slurry or the positive electrode for a lithium secondary battery, which is manufactured by the method of reusing a positive electrode material of the present invention, may have adhesive strength and battery characteristics which are equal to or higher than those of a positive electrode manufactured of a new or unused positive electrode material.

In the secondary mixing, the solvent temperature is not particularly limited, and specifically, for well dissolution of the second positive electrode active material and the second conducting agent, the solvent temperature may be 20° C. or more and less than the boiling point of the solvent, and preferably, 22 to 100° C.

The secondary mixing may be performed for 30 to 240 minutes, and preferably 60 to 120 minutes, and when the secondary mixing is performed for the above time, the dissolution of the second positive electrode active material and the second conducting agent may be facilitated, which is preferable in terms of process efficiency.

Hereinafter, the present invention will be described in further detail with reference to specific examples.

Example 1

A first positive electrode material slurry (viscosity of 3,800 cP) was prepared by mixing 187.50 g of a mixture (weight ratio of 97.5:1.5:1) of 182.81 g of $LiCoO_2$ as a first positive electrode active material, 2.81 g of PVdF (KF9700, Kureha) as a first binder, 1.88 g of carbon black (FX-35L, Denka) as a first conducting agent with 56.31 g of N-methyl-2-pyrrolidone (NMP) as a solvent for forming a slurry. The first positive electrode material slurry was applied on one surface of an aluminum current collector having a thickness of 20 μm, dried at 130° C. and then rolled, thereby manufacturing a positive electrode for a lithium secondary battery, which includes an aluminum current collector and a positive electrode active material layer formed on the aluminum current collector.

The positive electrode active material layer was separated from the aluminum current collector by inputting 187.50 g of the positive electrode active material layer for a lithium secondary battery prepared above into 300 g of NMP as a solvent, and performing ultrasonication (solvent temperature: 60° C.) for 10 minutes. Here, 150 g of the positive electrode active material layer, which is 80 wt % of the total weight thereof, was detached from the aluminum current collector, and in the separated positive electrode active material layer (150 g), there were 146.25 g of the first positive electrode active material, 2.25 g of the first binder, and 1.50 g of the first conducting agent. The separated aluminum current collector was removed from the solvent.

Afterward, 12.75 g of KF9700 powder was added to the solvent as second binder powder (average particle size ($D_{50}$): 160 μm), and dispersed in the solvent through primary mixing (Homo Disper: 2,000 RPM, solvent temperature: 70° C.) for 420 minutes. Here, the separated positive electrode active material layer through the primary mixing was subjected to a pulverizing process.

Subsequently, the positive electrode material slurry of Example 1 was prepared by inputting 828.75 g of a second positive electrode active material and 8.50 g of a second conducting agent into a solvent through secondary mixing (Homo Disper: 3,000 RPM, solvent temperature: 25° C.) for 75 minutes.

Here, a ratio of the total weight of the first positive electrode active material, the first binder and the first conducting agent and the total weight of the second positive electrode active material, the second binder powder and the second conducting agent was 15:85. The total weight (1000 g) of the first positive electrode active material, the first binder, the first conducting agent, the second positive electrode active material, the second binder powder and the second conducting agent was about 3.33 fold the solvent weight (300 g).

Example 2

A positive electrode material slurry of Example 2 was prepared by the same method as described in Example 1, except that 250 g of NMP was used as a solvent and 6.75 g of KF9700 powder (average particle size ($D_{50}$) 160 μm) was added as second binder powder in primary mixing, and 438.75 g of a second positive electrode active material and 4.50 g of a second conducting agent were added to the solvent in secondary mixing.

Here, a ratio of the total weight of a first positive electrode active material, a first binder and a first conducting agent and the total weight of a second positive electrode active material, second binder powder and a second conducting agent was 25:75. The total weight (600 g) of the first positive electrode active material, the first binder, the first conducting agent, the second positive electrode active material, the second binder powder and the second conducting agent was about 2.4 fold the solvent weight (250 g).

Comparative Example 1

The first positive electrode material slurry prepared in Example 1 was used.

Comparative Example 2

A positive electrode material slurry of Comparative Example 2 was prepared by the same method as described in Example 1, except that 4.18 g of KF9700 powder (average particle size ($D_{50}$): 160 μm) was added as second binder powder in primary mixing, and 271.61 g of a second positive electrode active material and 2.79 g of a second conducting agent were added to the solvent in secondary mixing.

Here, a ratio of the total weight of a first positive electrode active material, a first binder and a first conducting agent and the total weight of a second positive electrode active material, second binder powder and a second conducting agent was 35:65. The total weight (428.57 g) of the first positive electrode active material, the first binder, the first conducting agent, the second positive electrode active material, the second binder powder and the second conducting agent was about 1.43 fold the solvent weight (300 g).

Comparative Example 3

A positive electrode material slurry of Comparative Example 3 was prepared by the same method as described in Example 1, except that 212.50 g of a second binder solution (solid content: 6.0 wt %) prepared by dispersing KF9700 in an NMP solvent, instead of the second binder powder of Example 1, was added in primary mixing.

Here, a ratio of the total weight of a first positive electrode active material, a first binder and a first conducting agent and the total weight of a second positive electrode active material, the solid content of the second binder solution and a second conducting agent was 15:85. The total weight (1000 g) of the first positive electrode active material, the first binder, the first conducting agent, the second positive electrode active material, the solid content of the second binder solution and the second conducting agent was about 2 fold the total weight (499.75 g) of the solvent part of the solvent and the second binder solution.

Comparative Example 4

A positive electrode material slurry of Comparative Example 4 was prepared by the same method as described in Example 1, except that 12.75 g of the second binder powder of Example 1, 828.75 g of a second positive electrode active material and 8.5 g of a second conducting agent were added together and mixed in primary mixing, and secondary mixing was not performed.

Here, a ratio of the total weight of a first positive electrode active material, a first binder and a first conducting agent and the total weight of the second positive electrode active material, the second binder powder and the second conducting agent was 15:85. The total weight (1000 g) of the first positive electrode active material, the first binder, the first conducting agent, the second positive electrode active material, the second binder powder and the second conducting agent was about 3.33 the solvent weight (300 g).

Comparative Example 5

A positive electrode material slurry of Comparative Example 5 was prepared by the same method as described in Example 1, except that 212.50 g of the second binder solution of Comparative Example 3 (solid content 6 wt %), 828.75 g of a second positive electrode active material and 8.5 g of a second conducting agent were added together and mixed in primary mixing, and secondary mixing was not performed.

Here, a ratio of the total weight of a first positive electrode active material, a first binder and a first conducting agent and the total weight of the second positive electrode active material, the solid content of the second binder solution and the second conducting agent was 15:85. The total weight (1000 g) of the first positive electrode active material, the first binder, the first conducting agent, the second positive electrode active material, the solid content of the second binder solution and the second conducting agent was about 2 fold the total weight (499.75 g) of the solvent part of the solvent and the second binder solution.

Experimental Examples

1. Measurement of Adhesive Strength

A positive electrode was manufactured by applying the positive electrode material slurry prepared in each of the Examples and Comparative Examples on an aluminum current collector, drying at 130° C. and rolling the resulting product.

Afterward, electrode adhesive strength was measured using the manufactured positive electrode. A specific measurement method is as follows.

(1) An electrode was tableted to a size of 20 mm×150 mm.
(2) A double-sided tape was attached to a slide glass, and the electrode was put on the slide glass.
(3) The attachment was performed by rolling with a 2-kg roller five times.
(4) The force of peeling the electrode from the slide glass was measured using UTM (TA) equipment. The peeling was performed at a rate of 100 mm/min, and a measurement angle between the slide glass and the electrode was measured at 90 degrees.

A result measured according to the method is shown in Table 1 below.

TABLE 1

| | Example 1 | Example 2 | Comparative Example 1 | Comparative Example 2 | Comparative Example 3 | Comparative Example 4 | Comparative Example 5 |
|---|---|---|---|---|---|---|---|
| Electrode adhesive strength (gf/cm) | 42.8 | 45.1 | 40.3 | 35.8 | 11.2 | 24.0 | 14.7 |

Referring to Table 1, it can be confirmed that the positive electrode material and the positive electrode of each of Examples manufactured by previously adding a second binder in the form of powder and mixing with other ingredients in primary mixing exhibit an electrode adhesive strength equal to or higher than that of Comparative Example 1 that does not reuse a positive electrode material.

However, in Comparative Example 2 in which the mixing ratio of the first positive electrode active material, the first binder and the first conducting agent, to the second positive electrode active material, the second binder powder and the second conducting agent is beyond the range of the present invention, it can be confirmed that the electrode adhesive strength is lower than those of Examples.

In addition, it can be confirmed that Comparative Example 3 using the second binder in the form of a dispersion, not powder, does not have a high solid content and has poor viscosity, and thus the electrode adhesive strength is greatly lowered.

In addition, it can be confirmed that, in the case of Comparative Example 4 in which the second positive electrode active material, the second binder powder and the second conducting agent are mixed at one time without being mixed in two steps, for example, primary and secondary mixing processes, the second binder powder is neither sufficiently dispersed nor mixed, and thus the electrode adhesive strength is lowered.

In addition, in Comparative Example 5 in which the second binder is used in the form of a dispersion, and the second positive electrode active material, the second binder and the second conducting agent are mixed together at one time, it can be confirmed that the viscosity is greatly lowered and thus the electrode adhesive strength was reduced.

2. Evaluation of Cell Performance

The batteries of Examples 1 and 2 and Comparative Examples 1 to 5 were charged/discharged so as to evaluate capacity retention, and the result is shown in Table 2.

Each battery was charged/discharged at 0.5C/0.5C from cycles 1 to 200 at 45° C.

Charge conditions: constant current (CC)/constant voltage (CV)(4.25V/0.05C cut-off)

Discharge conditions: constant current (CC), 2.5V cut-off

The capacity retention was deduced by Equation below.

Capacity retention (%)=(Discharge capacity at cycle 200/Discharge capacity at cycle 1)×100

TABLE 2

|  | Example 1 | Example 2 | Comparative Example 1 | Comparative Example 2 | Comparative Example 3 | Comparative Example 4 | Comparative Example 5 |
| --- | --- | --- | --- | --- | --- | --- | --- |
| Capacity retention (%) | 92.5 | 91.5 | 92.8 | 74.9 | 82.8 | 75.2 | 83.0 |

Referring to Table 2, in Examples, since the second binder powder was previously dispersed uniformly through primary mixing, the adhesion and formation of the positive electrode active material layer are good, and since the first positive electrode active material, the first binder and the first conducting agent were mixed with the second positive electrode active material, the second binder powder and the second conducting agent in a preferable weight ratio, a similar level of battery performance was obtained, compared to Comparative Example 1 not reusing the positive electrode material.

However, in Comparative Example 2 in which the mixing weight ratio of the first positive electrode active material, the first binder and the first conducting agent to the second positive electrode active material, the second binder powder and the second conducting agent is beyond the range of the present invention, it can be seen that the capacity retention is significantly lowered, resulting in poor battery performance.

In addition, in Comparative Example 3 using the second binder in the form of a dispersion, rather than powder, the viscosity and electrode adhesive strength are very poor, which is not preferable in terms of battery production, and the battery performance was also evaluated to be very poor.

In addition, in Comparative Example 4 in which the second positive electrode active material, the second binder powder and the second conducting agent were mixed together at one time without being mixed in two steps, for example, primary and secondary mixing, since the second binder powder was not sufficiently dispersed and mixed in the slurry, it was evaluated that an electrode manufactured thereby also exhibited very poor battery performance.

In addition, in Comparative Example 5 in which the second binder was used in the form of a dispersion, and the second positive electrode active material, the second binder and the second conducting agent were mixed together at one time, a slurry had a very low viscosity, which is not preferable in terms of battery production, and the battery performance was also evaluated to be very poor.

The invention claimed is:

1. A method of reusing a positive electrode material, comprising:
    inputting a positive electrode for a lithium secondary battery comprising a current collector, and a positive electrode active material layer formed on the current collector and including a first positive electrode active material, a first binder and a first conducting agent, into a solvent;
    separating at least a portion of the positive electrode active material layer from the current collector in the solvent;
    adding a second binder powder to the solvent and performing primary mixing on a first resulting mixture, wherein, during the primary mixing, the separated positive electrode active material layer is pulverized and separated into the first positive electrode active material, the first binder and the first conducting agent and the second binder powder is mixed with the first positive electrode active material, the first binder and the first conducting agent in the solvent; and
    preparing a positive electrode material slurry by adding a second positive electrode active material and a second conducting agent to the solvent and performing secondary mixing on a second resulting mixture,
    wherein a ratio of a total weight of the first positive electrode active material, the first binder and the first conducting agent, which are included in a separated positive electrode active material layer, to a total weight of the second positive electrode active material, the second binder powder and the second conducting agent ranges from 8:92 to 28:72, and
    wherein a total weight of the first positive electrode active material, the first binder, the first conducting agent, the second positive electrode active material, the second binder powder and the second conducting agent is 2.25 to 6 fold a solvent weight.

2. The method according to claim 1, wherein at least a portion of the positive electrode active material layer is separated from the current collector through ultrasonication.

3. The method according to claim 2, wherein the ultrasonication is performed for 5 to 60 minutes.

4. The method according to claim 1, wherein the positive electrode for a lithium secondary battery is not subjected to a charge/discharge cycle process.

5. The method according to claim 1, wherein the solvent is N-methyl-2-pyrrolidone.

6. The method according to claim 1, wherein the second binder powder has an average particle size ($D_{50}$) of 100 to 300 μm.

7. The method according to claim 1, further comprising, after separating at least the portion of the positive electrode active material layer from the current collector, removing the current collector from the solvent.

8. The method according to claim 1, wherein 70 wt % or more of the positive electrode active material layer is separated from the current collector.

9. The method according to claim 1, wherein a weight of the separated positive electrode active material layer is 0.25 to 0.75 fold the solvent weight.

10. The method according to claim 1, wherein the primary mixing is performed for 30 to 600 minutes.

11. The method according to claim 1, wherein the secondary mixing is performed for 30 to 240 minutes.

12. The method according to claim 1, wherein, in the adding, the second binder powder is disposed and dissolved uniformly in the solvent.

13. The method according to claim 1, wherein the second binder powder is an identical material to a material of the first binder.

14. The method according to claim 1, wherein the second binder powder is different from the first binder.

15. The method according to claim 1, wherein the second binder powder is added to the solvent at 0.5 to 30 wt %.

16. The method according to claim 1, wherein the second positive electrode active material is added at 80 to 99 wt % with respect to the total weight of the second positive electrode active material, the second binder powder and the second conductive agent.

17. The method according to claim 1, wherein the ratio of the total weight of the first positive electrode active material, the first binder and the first conducting agent, which are included in the separated positive electrode active material layer, to the total weight of the second positive electrode active material, the second binder powder and the second conducting agent ranges from 10:90 to 25:75.

\* \* \* \* \*